US008069126B2

(12) United States Patent
Schiffer

(10) Patent No.: US 8,069,126 B2
(45) Date of Patent: Nov. 29, 2011

(54) METHOD OF RANKING POLITICALLY EXPOSED PERSONS AND OTHER HEIGHTENED RISK PERSONS AND ENTITIES

(75) Inventor: Mark A. Schiffer, Maplewood, NJ (US)

(73) Assignee: Safe Banking Systems, LLC, Mineola, NY (US)

( * ) Notice: Subject to any disclaimer, the term of this patent is extended or adjusted under 35 U.S.C. 154(b) by 763 days.

(21) Appl. No.: 12/117,239

(22) Filed: May 8, 2008

(65) Prior Publication Data

US 2008/0281765 A1 Nov. 13, 2008

Related U.S. Application Data

(60) Provisional application No. 60/917,427, filed on May 11, 2007.

(51) Int. Cl.
*G06F 15/18* (2006.01)
(52) U.S. Cl. .......................................................... 706/12
(58) Field of Classification Search ..................... 706/12
See application file for complete search history.

(56) References Cited

U.S. PATENT DOCUMENTS

| 6,767,213 | B2 | 7/2004 | Fleishman |
| 7,389,265 | B2 * | 6/2008 | Lawrence et al. ................ 705/38 |
| 2005/0044037 | A1 * | 2/2005 | Lawrence et al. ................ 705/38 |
| 2006/0258463 | A1 | 11/2006 | Cugno et al. |

* cited by examiner

*Primary Examiner* — Michael B Holmes
(74) *Attorney, Agent, or Firm* — Levine & Mandelbaum

(57) ABSTRACT

A method for ranking politically exposed persons and/or other persons and entities that pose a heightened risk based on their importance wherein an exposure index is determined for each person in the population as a function of the existence or absence of a relationship with each of the other members of the population and each of one or more exposure factors such as position held by the person, country in which the position is held, and source of information about the person. The politically exposed persons in the population are ranked in accordance with their respective exposure indexes. The population is sorted and a subset of the population containing those politically exposed persons having exposure indexes indicative or the highest likelihood of illicit financial activity is thereby identified.

8 Claims, 7 Drawing Sheets

| # | NAME | CATEGORY | POSITION | COUNTRY | RELATED TO | SOURCES |
|---|---|---|---|---|---|---|
| 1 | JOHN DOE | PEP | MAYOR | USA | JANE DOE (WIFE)<br>TOM SMITH (FATHER-IN LAW) | MAYORS.GOV<br>NEWS.COM |
| 2 | JANE DOE | PEP | | USA | JOHN DOE (HUSBAND)<br>TOM SMITH (FATHER) | NEWS.COM |
| 3 | RICHARD ROE | PEP | MAYOR | USA | | MAYORS.GOV |
| 4 | TOM SMITH | PEP | SENATOR | USA | JOHN DOE (SON-IN-LAW)<br>JANE DOE (DAUGHTER)<br>DICK SMITH (BROTHER)<br>HARRY SMITH (BROTHER) | SENATE.GOV<br>NEWS.COM |
| 5 | DICK SMITH | PEP, FRAUD | | USA | TOM SMITH (BROTHER)<br>HARRY SMITH (BROTHER) | JUSTICE.GOV<br>NEWS.COM |
| 6 | HARRY SMITH | PEP, FRAUD | | USA | TOM SMITH (BROTHER)<br>DICK SMITH (BROTHER) | JUSTICE.GOV<br>NEWS.COM |

FIG. 1

| # | NAME | EI | RANK |
|---|------|-----|------|
| 4 | TOM SMITH | 1.46 | 1ST |
| 5 | DICK SMITH | 0.98 | 2ND (TIED) |
| 6 | HARRY SMITH | 0.98 | 2ND (TIED) |
| 1 | JOHN DOE | 0.75 | 4TH |
| 2 | JANE DOE | 0.64 | 5TH |
| 3 | RICHARD ROE | 0.15 | 6TH |

FIG. 6

METHOD OF RANKING POLITICALLY EXPOSED PERSONS AND OTHER HEIGHTENED RISK PERSONS AND ENTITIES

BACKGROUND OF THE INVENTION

This invention is a method for ranking politically exposed persons ("PEPs") and/or other persons and entities that pose a heightened compliance, legal, regulatory, and reputation risk to financial institutions (e.g. known and suspected criminals and their associates) based on their centrality or "importance" within certain graph representations of the watch list databases in which are profiled. The rankings provide for an objective measure of the underlying risk posed by individual PEP's and other heightened-risk entities relative to others in the same watch list database source. The invention is considered to be particularly useful to financial institutions in screening potential and existing clients.

In the international financial industry, there is a general consensus that senior political figures, along with their family members and known close associates, collectively referred to as "Politically Exposed Persons" or "PEPs"—represent an inherent heightened risk given their direct or indirect access to public funds and influence over the business and commercial affairs in their jurisdictions. Consequently, most financial institutions are counseled, and in many cases required, to mitigate the risk of becoming wittingly or unwittingly complicit in the furtherance of political corruption by performing the following steps: 1) proactively identifying customers who are PEPs, 2) comprehensively assessing the acceptability of the specific risk they pose and, 3) if deemed to pose an acceptable risk, placing their accounts under continuing heightened scrutiny and periodic re-assessment.

For the first step, proactive identification, many financial institutions automatically screen their client databases against subscription-based commercial PEP watch list databases that are themselves compiled from public sources such as government, law enforcement and news media websites. Many of these databases, since coming into being, have augmented their coverage beyond PEPs to include other categories of risk (e.g. fraud, money laundering, narcotics crime, terrorism, etc.) and are often referred to as "PEP/KYC databases" ("KYC" is an acronym for "Know Your Customer", industry parlance for general customer due diligence policies). Records of related persons and entities in PEP/KYC databases typically link to one another.

The screening of large target client databases against large source PEP/KYC databases inevitably leads to the problem of false positive matches given the public nature of the source data; PEP/KYC database records rarely provide unique identifiers such as social security numbers and often do not provide strong ones such as date of birth. Thus, most matches are generated based solely on the similarity between target and source names and can be properly viewed only as a starting point for investigating whether the two matching names represent the same person or entity.

In wide-recognition of the infeasibility of investigating all potential matches, there is a consensus in favor of a risk-based approach where priority is given to matches against the highest-risk PEP/KYC records. Such an approach requires some method for grouping or ranking PEP/KYC records by risk. The conventional method makes use of the various category and attribute fields available in records such as risk type (e.g. PEP, fraud, narcotics, terrorism), political position (e.g. Presidents, Governors, Mayors) and country of origin to create risk groups (e.g. Presidents from Countries X and Y are a high-risk group; Mayor from Country Z, a low-risk one). A related variant is a rudimentary risk scoring scheme where category values are assigned scores (e.g. Presidents=3, Governors=2, Mayors=1, Country X=3, Country Y=2, Country Z=1) that are aggregated to derive profile scores (e.g. Presidents from Country X=3×3=9, Mayors from Country Z=1×1=1).

These top-down, category-based methods come in infinite varieties but operate from the same overly simplistic premise: namely that the level of risk that best characterizes a general class of PEP/KYC records adequately characterizes each individual member of that class. Local officials from highly developed countries, for example, may be best characterized as low risk as a general class. It does not follow, however, that each individual local official from a highly developed country is adequately characterized as low risk. It certainly does not adequately characterize the local official, for example, who happens to be the related to a prominent national political figure or notorious criminal or who is reported in the news to be under suspicion for corruption.

The example above alludes to a more useful alternative approach where PEP/KYC records are not evaluated based on their membership to a general class (e.g. local officials) but based on their particular connections to relevant entities (e.g. ties to a prominent national figure or a notorious criminal, or a news article on corruption).

SUMMARY OF THE INVENTION

The present invention is a method of measuring the importance imparted to each member of a population of persons by having a relationship with at least one other member of the population and/or being affected by at least one exposure factor. According to the method, an identifier is assigned to each member of the population of politically exposed persons. A designator is assigned to each exposure factor having an effect on at least one of the members of the population of politically exposed persons. An exposure index is then derived for each member of the population of politically exposed persons and for each exposure factor. The exposure index is a recursive function of the exposure indexes derived for each of the respective other members of the population of politically exposed persons having a relationship with the member, and of the indexes derived for each of the exposure factors having an effect on the member. The exposure factors may include one or more of the following: political position of the member, geographical jurisdiction in which the member resides or operates, and source of published information which mentions the member. The list of the members is sorted in order of derived exposure index and then filtered to provide a subset of the members of the population who present the greatest risk.

DESCRIPTION OF THE DRAWINGS

FIG. 1 is a tabular description of a population of politically exposed persons;

FIG. 6 is a tabular description of the ranking of a population of politically exposed persons;

DESCRIPTION OF THE PREFERRED EMBODIMENT

While PEP/KYC databases are typically created, stored and used in tabular format, they can be represented as a series of interconnected graphs. These graphs can be divided into three distinct types: 1) a regular social graph where PEP's are nodes connected by explicit social relationships 2) a binomial graph where PEPs are one class of nodes and one or more exposure factors (e.g. information sources, political positions) are the other class and 3) a graph where exposure factors are nodes connected to each other by virtue of being connected to the same PEP.

Figure 3:
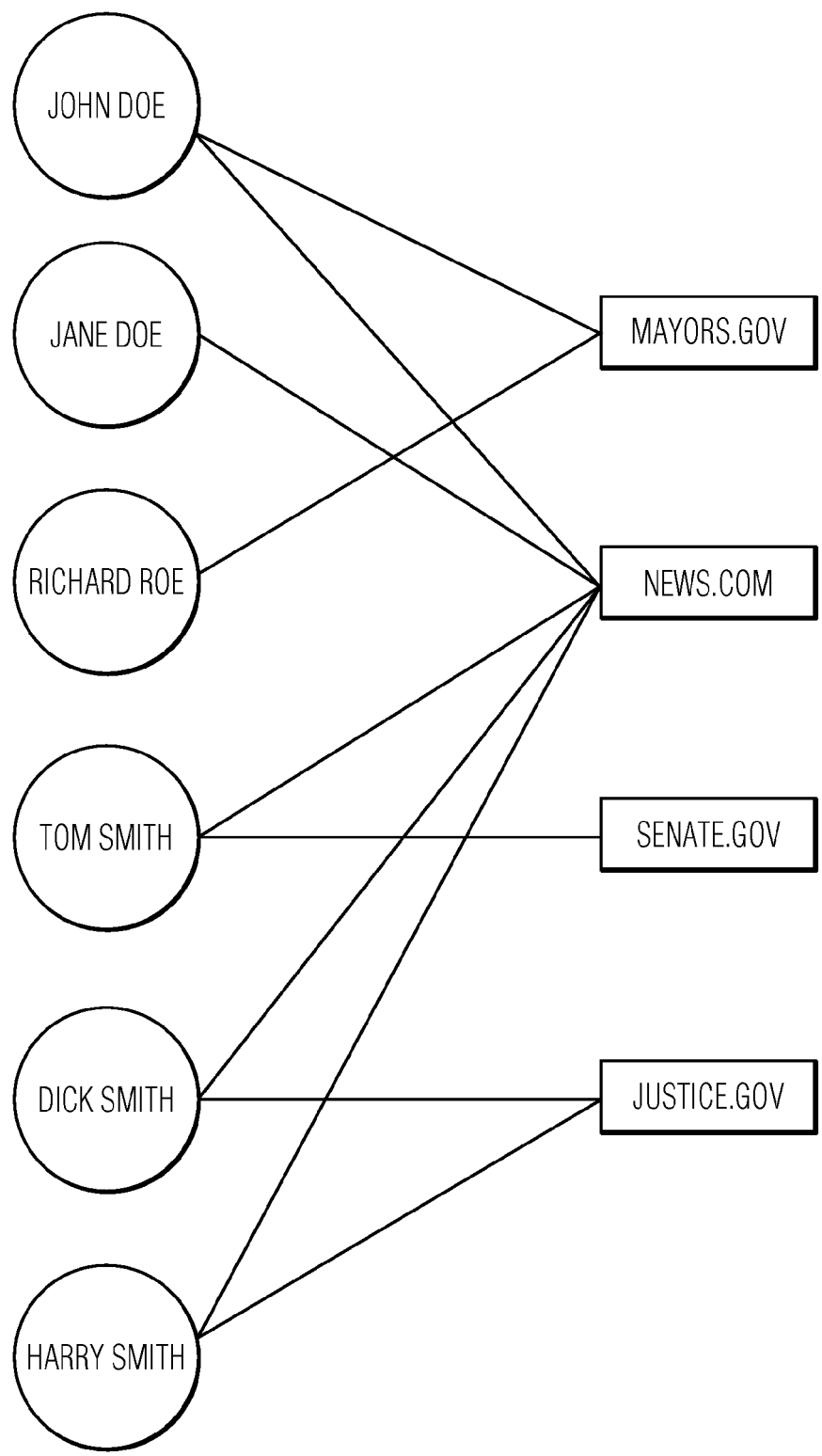
FIG. 3 is a graphical view of the relationships between the politically exposed persons described in FIG. 1 and sources of information which mention one or more of the politically exposed persons listed in FIG. 1.

To illustrate the above, a database table listing a population of politically exposed persons is illustrated in FIG. 3. The database may be stored on a computer-readable medium such as a magnetic disc as will be known by those skilled in the art. While typical PEP/KYC databases contain hundreds of thousands to millions of records, for simplicity, this population consists of only six.

In the table, a record for John Doe indicates that he is a mayor of a city in the United States and that his wife is Jane Doe and father-in-law is Tom Smith. This information was found on website entitled "Mayors.com" and "News.com." Jane Doe is also listed as a politically exposed person by virtue of having a relationship with husband, John Doe, and father, Tom Smith. Although not an officeholder, Jane Doe is mentioned in her capacity as being a family member of officeholders on the websites entitled Mayors.gov and News.com.

Richard Roe is also listed as a mayor of a U.S. city by the source Mayors.gov but is not listed as having any relationships.

Tom Smith is listed as a senator in the U.S. and as having four relationships: John and Jane Doe, his daughter and son-in-law, and Dick and Harry Smith, his two brothers. This information was found on two websites: Senate.gov and News.com. Finally, Dick and Harry Smith are listed as PEPs due to their relationship to their brother, a senator, and in the Fraud category due to criminal convictions as mentioned in the Justice.gov source.

Figure 2:
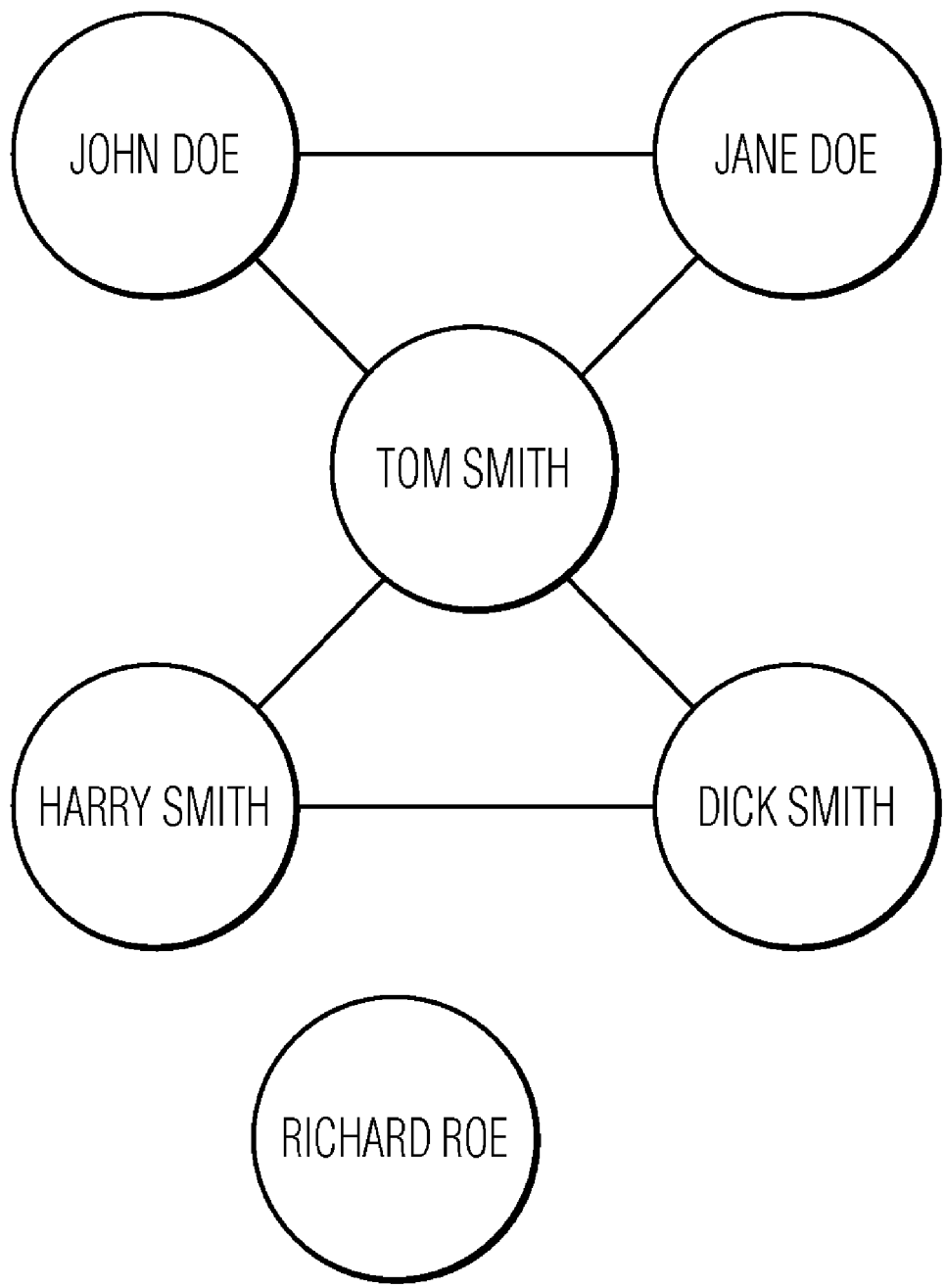
FIG. 2 is a graphical view of the relationships among the politically exposed persons described in FIG. 3.
Figure 4:
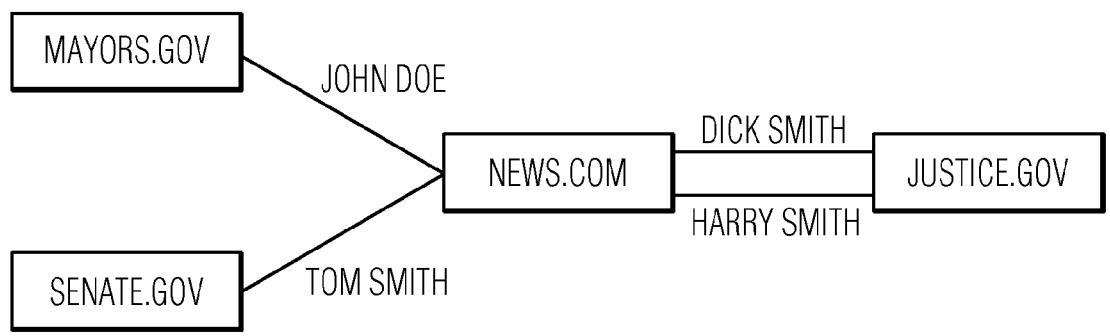
FIG. 4 is a graphical view of the relationships between the information sources described in FIG. 1 that are connected by virtue of co-citing same the politically exposed persons listed in FIG. 1.
Figure 5:
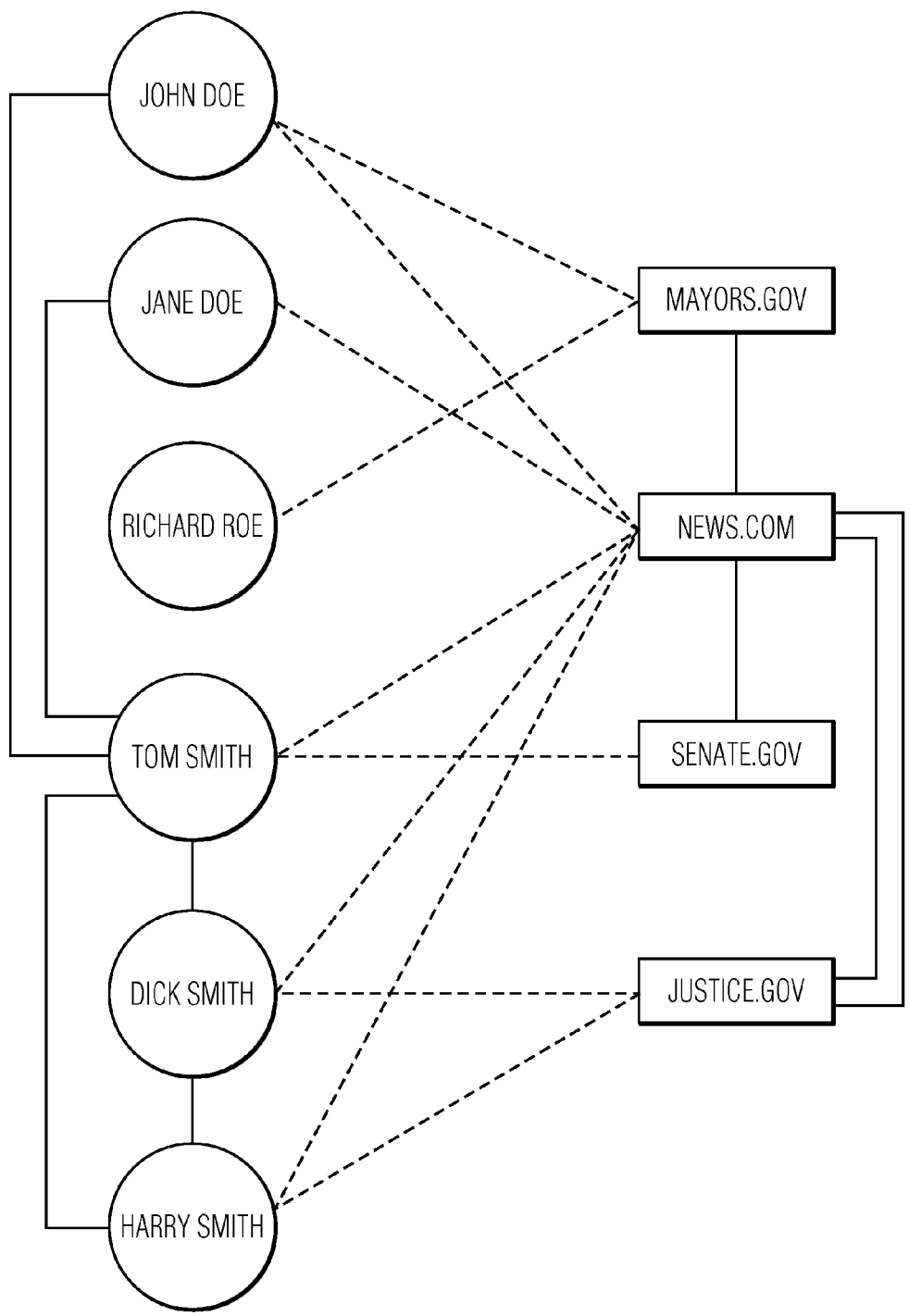
FIG. 5 combines the graphs of FIGS. 2-4. into a single graph

FIGS. 2-5 are graphical representations of the relationships contained in FIG. 1. FIGS. 2-4 represent individual graphs that correspond to the three types of graphs described above. Note in FIG. 4 that the information sources Mayor.gov and News.com are connected because they are both sources for John Doe and that Senate.gov and News.com are connected because they are both sources for Tom Smith. Similarly, Justice.gov and News.com have two connections as they are both sources for Dick and Harry Smith. FIG. 5 illustrates the three previous separate graphs as a combined, interconnected one.

The interconnected graph allows an "Exposure Index" or "EI" or risk score for each PEP and exposure factor to be calculated in a recursive fashion based on the Exposure Index of the PEPs and exposure factors connected to a given PEP or exposure factor.

In one preferred embodiment, the recursive Exposure Index can be found by solving the following system of linear equations derived from the graph representation of a PEP/KYC database:

$$x_i = \alpha \left( \sum_{j=1}^{m} \frac{a_{ij} x_j}{a_j} + \sum_{k=1}^{n} \frac{b_{ik} y_k}{b_k} \right)$$

$$y_k = \beta \left( \sum_{i=1}^{m} \frac{b'_{ki} x_i}{b'_i} + \sum_{l=1, \neq k}^{n} \frac{c_{kl} y_l}{c_l} \right)$$

Where:

$x_i$ is the EI of the ith profile in a set of m profiles x;

$y_k$ is the EI of the jth profile in a set of n profiles y;

$a_{ij} = a_{ji} = 1$ if there is a link between profile i and profile j, otherwise $a_{ij} = a_{ji} = 0$.

$$a_j = \sum_{i=1}^{m} a_{ij},$$

i.e., the total number of profiles linked to profile j.

$b_{ik} = b'_{ki} = 1$ if there is a link between profile i and source k, otherwise $b_{ik} = b'_{ki} = 0$.

$$b_k = \sum_{i=1}^{m} b_{ik}, \; b'_i = \sum_{k=1}^{n} b'_{ki},$$

i.e., the total number of profiles linked to source j and the total number of sources linked to profile i, respectively.

$$c_{kl} = \sum_{i=1}^{m} b'_{ki} b_{il},$$

i.e., the number of profiles which link to both source k and source l.

$$c_l = \sum_{\substack{i=1, \\ \neq k}}^{m} c_{kl},$$

i.e., the total number of profiles which link to both source k and another source l for all source l not equal to k.

$0 \leq \alpha, \beta \leq 1$ and $\alpha + \beta = 1$

Using the given example and assuming $\alpha = \beta = 0.5$, the system of equations becomes:

$EI(\text{JohnDoe}) = .5 * (EI(\text{JaneDoe})/2 + EI(\text{TomSmith})/4) +$ $.5 * EI(\text{Mayors.gov})/2 + (EI(\text{News.com})/5)$ $EI(\text{JaneDoe}) = .5 * (EI(\text{JohnDoe})/2 + EI(\text{TomSmith})/4) +$ $.5 * (EI(\text{News.com})/5)$ $EI(\text{RichardRoe}) = .5 * (EI(\text{Mayors.gov}))$ $EI(\text{TomSmith}) =$ $.5 * (EI(\text{JohnDoe})/2 + EI(\text{JaneDoe})/2 + EI(\text{DickSmith})/2 +$ $EI(\text{HarrySmith})/2 + .5 * (EI(\text{Senate.gov}) + EI(\text{News.com})/5)$ -continued $EI(\text{DickSmith}) = .5 * (EI(\text{TomSmith})/4 + EI(\text{HarrySmith})/2) +$
$\qquad .5 * (EI(\text{News.com})/5 + EI(\text{Justice})/2)$ $EI(\text{HarrySmith}) = .5 * (EI(\text{TomSmith})/4 + EI(\text{DickSmith})/2) +$
$\qquad .5 * (EI(\text{News.com})/5 + EI(\text{Justice})/2)$ $EI(\text{Mayors.gov}) = .5 * (EI(\text{JohnDoe})/2 + EI(\text{RichardRoe})) +$
$\qquad .5 * (EI(\text{News.com})/4)$ $EI(\text{News.com}) = .5 * (EI(\text{JohnDoe})/2 + EI(\text{JaneDoe}) + EI(\text{TomSmith})/2 +$
$\qquad EI(\text{DickSmith})/2 +$
$\qquad EI(\text{HarrySmith})/2) +$
$\qquad .5 * (EI(\text{Mayors.gov}) + EI(\text{Senate.gov}) +$
$\qquad EI(\text{Justice.gov}))$ $EI(\text{Senate.gov}) = .5 * (EI(\text{TomSmith})/$
$\qquad 2) + .5 * (EI(\text{News.com})/4)$ $EI(\text{Justice.gov}) = .5 * (EI(\text{Dick Smith})/2) + EI(\text{Harry Smith})/2) +$
$\qquad .5 * (2 * EI(\text{News.com})/4)$ Typically, it is easier to express and solve system of linear of equations in matrix form:

$$\begin{vmatrix} x \\ y \end{vmatrix} = \begin{vmatrix} \alpha A & \alpha B \\ \beta B' & \beta B \end{vmatrix} \begin{vmatrix} x \\ y \end{vmatrix}$$

The example becomes:

$$\begin{vmatrix} x_1 \\ x_2 \\ x_3 \\ x_4 \\ x_5 \\ x_6 \\ y_1 \\ y_2 \\ y_3 \\ y_4 \end{vmatrix} = \begin{vmatrix} 0 & .25 & 0 & .125 & 0 & 0 & .25 & .1 & 0 & 0 \\ .25 & 0 & 0 & .125 & 0 & 0 & 0 & .1 & 0 & 0 \\ 0 & 0 & 0 & 0 & 0 & 0 & .25 & 0 & 0 & 0 \\ .25 & .25 & 0 & 0 & .25 & .25 & 0 & .1 & .5 & 0 \\ 0 & 0 & 0 & .125 & 0 & .25 & 0 & .1 & 0 & .25 \\ 0 & 0 & 0 & .125 & .25 & 0 & 0 & .1 & 0 & .25 \\ .25 & 0 & .5 & 0 & 0 & 0 & 0 & .125 & 0 & 0 \\ .25 & .5 & 0 & .25 & .25 & .25 & .5 & 0 & .5 & .5 \\ 0 & 0 & 0 & .25 & 0 & 0 & 0 & .125 & 0 & 0 \\ 0 & 0 & 0 & 0 & .25 & .25 & 0 & .25 & 0 & 0 \end{vmatrix} \begin{vmatrix} x_1 \\ x_2 \\ x_3 \\ x_4 \\ x_5 \\ x_6 \\ y_1 \\ y_2 \\ y_3 \\ y_4 \end{vmatrix}$$

The above yields the following solution:

$$\begin{vmatrix} x_1 \\ x_2 \\ x_3 \\ x_4 \\ x_5 \\ x_6 \\ y_1 \\ y_2 \\ y_3 \\ y_4 \end{vmatrix} = \begin{vmatrix} 0.75 \\ 0.64 \\ 0.15 \\ 1.46 \\ 0.98 \\ 0.98 \\ 0.59 \\ 2.60 \\ 0.69 \\ 1.15 \end{vmatrix}$$

Which, in turns, yields the rankings of FIG. 6. Of particular note is the difference in rank between John Doe and Richard Roe. Both are mayors of U.S. cities and would receive the same ranking in many prior art systems. However, this invention credits John Doe with the additional risk inherent in being married to the daughter of a Senator who, in turn, is a brother of two convicted criminals.

It must be pointed that it is only due to the small size (i.e. six PEPs) of this example that the solution to above equation could be calculated directly. In real world situations where there are hundreds of thousands or millions of PEP's, other heightened risk entities and exposure factors, the solution must be arrived at iteratively through successive approximation after making an initial arbitrary guess (i.e. a vector of all ones) as follows:

$$\begin{vmatrix} x_0 \\ y_0 \end{vmatrix} = \begin{vmatrix} 1_m \\ 1_n \end{vmatrix} \Rightarrow \begin{vmatrix} x_{n+1} \\ y_{n+1} \end{vmatrix} = \begin{vmatrix} \alpha A & \alpha B \\ \beta B' & \beta B \end{vmatrix} \begin{vmatrix} x_n \\ y_n \end{vmatrix}$$

The above is based on the convergence of an infinite sequence until the difference between the last term of the sequence and the preceding term is less than or equal to a predetermined small number, $\epsilon$:

$$\begin{vmatrix} x \\ y \end{vmatrix} = \lim_{n \to \infty} \begin{vmatrix} \alpha A & \alpha B \\ \beta B' & \beta B \end{vmatrix}^n \begin{vmatrix} x_n \\ y_n \end{vmatrix}$$

Figure 7:
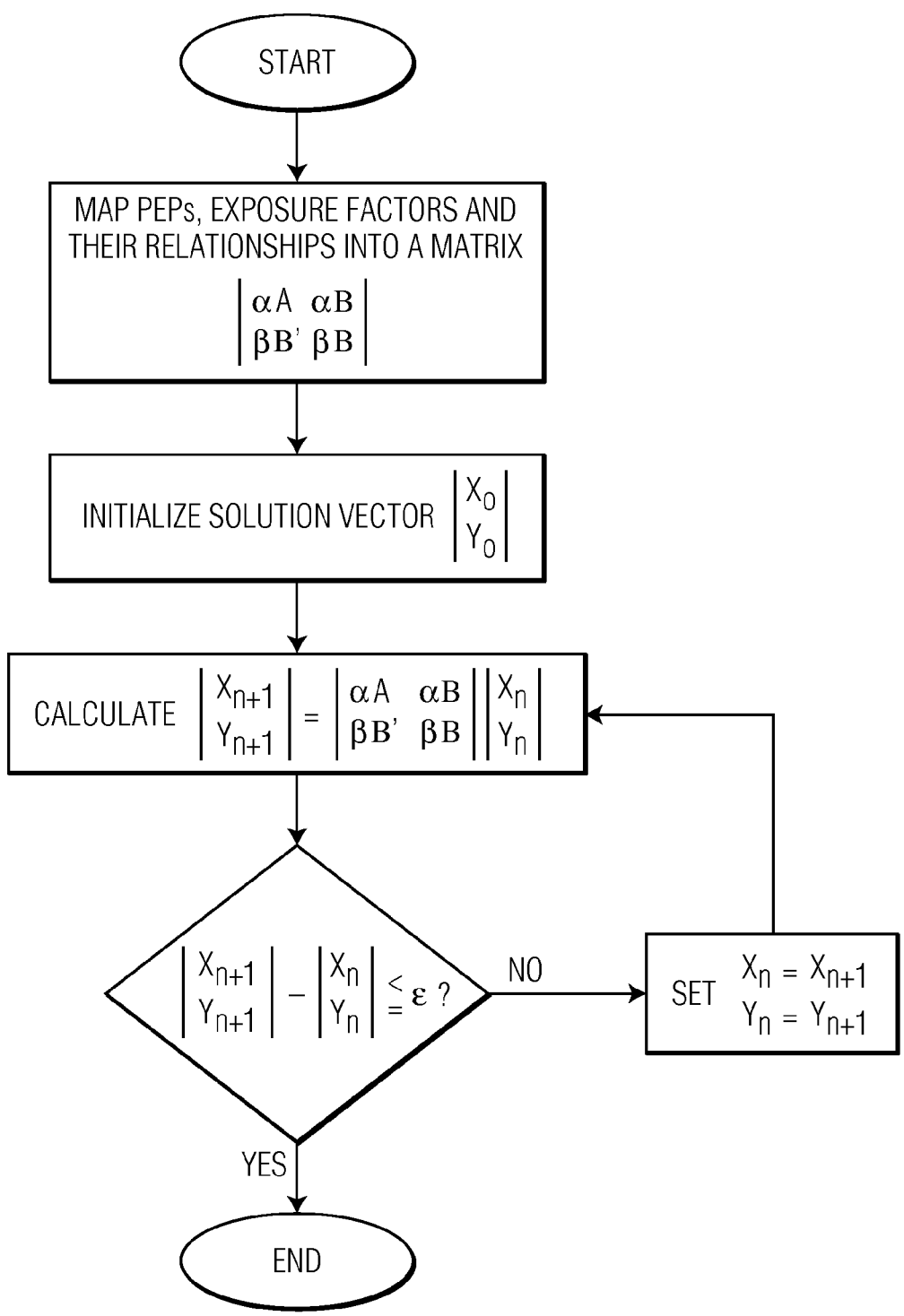
FIG. 7 is a mathematical flow diagram illustrating the logic of the method of the invention.

FIG. 7 illustrates a flow chart of this iteration process.

Exposure factors are not limited to sources but may include one or more of the following: political position of the member, geographical jurisdiction in which the member resides or operates, and source of published information which mentions the member. Each exposure factor to which a PEP is related adds another component to the exposure index for the PEP. In addition, although the method of the invention does not require that sources of risk be weighted relative to one another as is done in the prior art, the present invention can take into account a priori estimates of relative risk. For example, when the exposure index of PEPs is based on exposure to other PEPs, categories/positions, and country of residence, and it is desired to include an a priori estimate of risk such as Transparency International's corruption perception index which ranks countries in accordance with their perceived levels of corruption, the exposure index can be calculated from the following:

$$x_i = \frac{1}{3}\left(\sum_{j=1}^{m} \frac{a_{ij} x_j}{a_j} + \sum_{j=1}^{n} \frac{b_{ij} y_j}{b_j} + \sum_{k=1}^{p} \sum_{l=1}^{q} \frac{c_{i_l^k} z_{k_l}}{c_{k_l}}\right)$$

$$y_j = \frac{1}{3}\left(\sum_{i=1}^{m} \frac{b'_{ji} x_i}{b'_j} + \sum_{\substack{k=1,\\ \neq j}}^{n} \frac{\left(\sum_{i=1}^{m} b'_{ji} b_{ik}\right) y_k}{b' b_k} + \sum_{k=1}^{p} \sum_{l=1}^{q} \frac{\left(\sum_{i=1}^{m} b'_{ji} c_{i_l^k}\right) z_{k_l}}{b' c_{k_l}}\right)$$

$$z_{k_l} = \frac{1}{3}\left(\sum_{i=1}^{m} \frac{c'_{k_l i} x_i}{c'_i} + \sum_{i=1}^{n} \frac{\left(\sum_{i=1}^{m} c'_{k_l i} b_{ij}\right) y_j}{c' b_j} + \sum_{j=1}^{p} \frac{cpi_{k_l j} z_j}{cp_{i_l^j}}\right)$$

Where:
$x_i$ is the EI of the ith profile in a set of m profiles x;
$y_j$ is the EI of the jth profile in a set of n profiles y;
$z_{k_l}$ is the EI of the kth country and lth category/position pair in a set of p countries and q categories and positions;

$a_{ij}=a_{ji}=1$ if there is a link between profile i and profile j, otherwise $a_{ij}=a_{ji}=0$.

$$a_j = \sum_{i=1}^{m} a_{ij},$$

i.e., the total number of profiles linked to profile j.

$b_y=b'_{ji}=1$ if there is a link between profile i and source j, otherwise $b_y=b'_{ji}=0$.

$$b_j = \sum_{i=1}^{m} b_{ij}, \; b'_i = \sum_{j=1}^{n} b'_{ji},$$

i.e., the total number of profiles linked to source j and the total number of sources linked to profile I, respectively.

$c_{ik_l}=c'_{k_l}=1$ if there is a link between profile i and country k plus category/position l, otherwise $c_{ik_l}=c'_{k_l}=0$.

$$c_{k_l} = \sum_{i=1}^{m} c_{i k_l}, \; c'_i = \sum_{k=1}^{p}\sum_{l=1}^{q} c_{k_l i},$$

i.e., the total number of profiles linked to country k and category/position l, and vice versa, respectively.

$$\sum_{i=1}^{m} b'_{ji} b_{ik},$$

i.e., the number of profiles which link to both source j and source k.

$$b'b_k = \sum_{j=1}^{n}\sum_{l=1}^{m} b'_{ji} b_{ik}$$

is the total number of source co-links with source k for all sources.

$$\sum_{i=1}^{m} b'_{ji} c_{i_l^k} = \sum c'_{k_l^i} b_{ij}$$

i.e., the total number of profiles which link to both source j and country k plus category/position l.

$cpi_{k_j l_i}$=the inverse of the Transparency Int'l Corruption Perception Index for country k, if ranked; otherwise $Cpi_{k_j l_i}$=the average inverse Transparency International Corruption Perception Index for all countries.

$$cpi_j = \sum_{k=1}^{p} cpi_{k_j l_i},$$

i.e., a CPI normalization factor.

The above formulas can be recursively solved through the use of a computer, as will be known by those skilled in the art.

In matrix notation, the linear system of equations becomes an eigensystem where the vector of EI scores corresponds to the principal eigenvector of the composite matrix:

$$\begin{vmatrix} x \\ y \\ z \end{vmatrix} = \frac{1}{3} \begin{vmatrix} A & B & C \\ B' & B'B & B'C \\ C' & C'B & CPI \end{vmatrix} \begin{vmatrix} x \\ y \\ z \end{vmatrix}$$

As can be seen from the foregoing, the method of the invention determines a ranking of risk presented by members of a population based solely on the number of relationships between the persons themselves, and between the persons and exposure factors such as information source, geographic region, and political/career position. Errors introduced by prior art ranking methods in prematurely weighting the various exposure factors without consideration of their relationships to the population to be ranked are avoided.

It is to be appreciated that variations and modifications may be made to the invention without departing from the spirit and scope of the invention.

What is claimed is:

1. A method of measuring the importance imparted to each member of a population of persons by having a relationship with at least one other member of said population and/or at least one exposure factor, said method comprising the following steps:

assigning an identifier to each one of said members of said population of persons, assigning a designator to each exposure factor related to at least one of said members of said population of persons, for each one of said members of said population of persons, and each one of said exposure factors, recursively assigning an exposure index which is a function of the exposure indexes assigned to each of the respective other members of said population of persons having a relationship with said one member of said population and the indexes assigned to each of the exposure factors having a relationship to one of said members of said population of persons.

2. A method according to claim 1 wherein one of said exposure factors is a function of a political position held by one or more of said members of said population of persons.

3. A method according to claim 1 wherein one of said exposure factors is a function of a geographical jurisdiction in which one or more of said members of said population of persons resides.

4. A method according to claim 1 wherein one of said exposure factors is a function of a source of published information about one or more of said members of said population.

5. A method according to claim 1 further comprising, preparing a list of said identifiers sorted in order of their respective exposure indexes, filtering said sorted list of said identifiers to obtain a filtered list of a subset of said population of persons having the greatest importance among said population of persons.

6. A method of ranking members of a population of persons by their importance, each of said members having a relationship with a contributing source selected from the group consisting of all other members of said population and all exposure factors of a group of exposure factors having an effect on the importance of at least one of said members, said method comprising the following steps:

for each member of said population and for each of said exposure factors, counting the number of direct relationships between said member or exposure factor and each contributing source, and recording each count, and recursively weighting the count recorded for each member as a function of the count recorded for each contributing source until each count reaches a constant magnitude, said magnitude being proportional to an exposure index for said member.

7. A method according to claim 6 further comprising ranking said members in accordance with their importance by sorting a list of said members by their respective exposure indexes.

8. A method according to claim 6 further comprising normalizing the portion of each count contributed by a contributing source by dividing said component by the number of relationships said contributing source has with other contributing sources.

* * * * *